US011341133B2

(12) United States Patent
Sidoti et al.

(10) Patent No.: US 11,341,133 B2
(45) Date of Patent: May 24, 2022

(54) METHOD AND SYSTEM FOR COLLABORATIVE AND DYNAMIC QUERY OPTIMIZATION IN A DBMS NETWORK

(71) Applicant: International Business Machines Corporation, Armonk, NY (US)

(72) Inventors: Stefano Sidoti, Rome (IT); Valerio Bellizia, Colleferro (IT); Nicola Milanese, Rome (IT)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 16/171,808

(22) Filed: Oct. 26, 2018

(65) Prior Publication Data

US 2020/0134070 A1 Apr. 30, 2020

(51) Int. Cl.
*G06F 16/00* (2019.01)
*G06F 16/2453* (2019.01)
*G06F 16/23* (2019.01)
*G06F 16/25* (2019.01)

(52) U.S. Cl.
CPC ........ *G06F 16/24542* (2019.01); *G06F 16/23* (2019.01); *G06F 16/25* (2019.01)

(58) Field of Classification Search
CPC ..... G06F 16/24542; G06F 16/23; G06F 16/25
USPC .......................................................... 707/713
See application file for complete search history.

(56) References Cited

U.S. PATENT DOCUMENTS

| 6,546,381 | B1 | 4/2003 | Subramanian et al. |
|---|---|---|---|
| 8,423,535 | B2 | 4/2013 | Weissman et al. |
| 9,391,902 | B2 | 7/2016 | Elias et al. |
| 2005/0071331 | A1* | 3/2005 | Gao .................. G06F 16/24547 |
| 2007/0050328 | A1* | 3/2007 | Li ........................ G06F 16/9032 |
| 2009/0024563 | A1 | 1/2009 | Sengar |
| 2010/0036801 | A1* | 2/2010 | Pirvali .................... G06F 8/443 |
|  |  |  | 707/713 |
| 2011/0295839 | A1 | 12/2011 | Collins et al. |
| 2013/0006960 | A1 | 1/2013 | Barbas |
| 2013/0311446 | A1 | 11/2013 | Clifford et al. |

(Continued)

OTHER PUBLICATIONS

Qiang Zhu, Query Optimization in Multidatabase Systems, Abstract, Proceedings of the 1992 Conference of the Centre for Advanced Studies on Collaborative Research—vol. 2, pp. 111-127, Toronto, Ontario, Canada, Nov. 9-12, 1992.

(Continued)

*Primary Examiner* — Monica M Pyo
(74) *Attorney, Agent, or Firm* — Terrile, Cannatti & Chambers, LLP; Michael Rocco Cannatti

(57) ABSTRACT

A method, system, apparatus, and a computer program product are provided for optimizing database query plans generated from a received database query at a database management system by monitoring a global cost estimation function for one or more steps of the received database query to identify a first low-performing cost metric and collaboratively optimizing a query plan for the database query by comparing differences between the first low-performing cost metric and a second cost metric at an additional database management system, thereby generating an optimized query plan for the database management system that may be stored at the database management system along with corresponding information identifying a reason for rewriting the optimized query plan.

15 Claims, 3 Drawing Sheets

(56) References Cited

U.S. PATENT DOCUMENTS

| | | | |
|---|---|---|---|
| 2014/0095475 A1* | 4/2014 | Su | G06F 16/24544 |
| | | | 707/718 |
| 2015/0317359 A1* | 11/2015 | Tran | G06F 16/24542 |
| | | | 707/718 |
| 2016/0239544 A1 | 8/2016 | Kondo et al. | |
| 2018/0183864 A1 | 6/2018 | Bender et al. | |
| 2018/0253248 A1 | 9/2018 | Bellizia et al. | |

OTHER PUBLICATIONS

Robert Taylor, Query Optimization for Distributed Database Systems, Submitted as part of Master of Computer Science Computing Laboratory University of Oxford, Aug. 2010, http://www.cs.ox.ac.uk/people/dan.olteanu/theses/Robert.Taylor.pdf.

Mingyi Zhao et al., Towards Collaborative Query Planning in Multi-Party Database Networks, IFIP International Federation for Information Processing, 2015.

Mumtaz Ahmad, Query Interactions in Database Systems, Thesis submitted for the degree of Doctor of Philosophy in Computer Science, Waterloo, Ontario, Canada, 2012.

stackexchange.com, What are database statistics, and how can I benefit from them? Jan. 23, 2011 https://dba.stackexchange.com/questions/808/what-are-database-statistics-and-how-can-i-benefit-from-them.

Wikipedia, Query Plan, edited Oct. 16, 2018.

Wikipedia, Relational database management system, printed Sep. 9, 2018.

Nodira Khoussainova et al., A Case for A Collaborative Query Management System, http://cqms.cs.washington.edu/papers/cqms-cidr09.pdf, 2009.

* cited by examiner

METHOD AND SYSTEM FOR COLLABORATIVE AND DYNAMIC QUERY OPTIMIZATION IN A DBMS NETWORK

BACKGROUND OF THE INVENTION

Field of the Invention

The present invention relates in general to the field of performance analysis of a database. In one aspect, the present invention relates to a software-based method, system and computer-usable medium for optimizing queries in a database management system.

Description of the Related Art

A relational database management system (DBMS), also referred to as database engines, stores very large volumes of data, such as employment records, computer logs, or other suitable information. DBMSs typically store this information for use by various software components, such as web servers, application programs, etc. Some DBMSs store information in tables organized in rows and columns. Some DBMSs support complex languages like SQL (Structured Query Language). A DBMS server may receive and process SQL queries that request data. In turn, the DBMS server performs operations defined in the queries, and returns data associated with the queries. With increasing complexity and quantity of queries executed on relational database servers, it becomes increasingly difficult to estimate the resource requirements and/or consumption of the SQL queries, which for example is required to determine bottleneck queries and SQL admission controls. Accordingly, query optimization functions are included in many relational database management systems to determine the most efficient way to execute a given query by considering the possible query plans, where each query plan is the logical representation of the operation performed by the query including the cost of each operation. However, there are a number of design challenges for database administrators and developers to solve when performing query optimization. For example, different DBMSs offer different tools to customize the system and fit the needs of the applications that are built on top of it. While the starting point and main tool for query optimization is the query plan, even under similar conditions in terms of system load and hardware, two computers may produce different query plans due to the way they compute the statistics and heuristics applied to calculate a query plan. Results may diverge considerably, and usually it is not easy to understand where to act to fill the gap of the slower system. Taking into consideration the dependency on hardware, statistics and load, similar systems usually produce similar query plans, and the optimizations that prove to be successful on a system are usually valuable also on systems that are similar from this point of view. Accordingly, there are drawbacks to conventional solutions since users of the rate-based system must acquire a larger license than is required for their global deployment of the system. As a result, the existing query optimization solutions are extremely difficult at a practical level since there is no tool that is able to correlate query plans on different systems taking into account hardware and load differences.

SUMMARY

Broadly speaking, selected embodiments of the present disclosure provide a system, method, computer program product, and apparatus for collaborative and dynamic query optimization for submission to database management systems by configuring a system of interconnected DBMS servers, each having comparable hardware resources and a comparable system load (e.g., database statistics, I/O, CPU, etc.), so that each DBMS server is able to collaborate with other DBMS servers to identify solutions and/or local query plans in the interconnected DBMS server system which solve query performance issues, thereby enabling dynamic query optimization based on solutions and local query plans discovered on the DBSM server system. In selected embodiments, each DBMS server in the system may include a query cost manager component that is configured to build, for each query, a deployment cost estimation function (DCEF) on the basis of the normalized data gathered for the query. In selected embodiments, a computed deployment cost function for query may be quantified as a "timeron" which is an abstract unit of measure which gives a rough relative estimate of the resources (cost) required by the database manager to execute a query plan. For example, timeron cost values may be derived from a combination of CPU cost (in number of instructions) and Input/Output (I/O) cost (in numbers of seeks and page transfers). For any low-performing or "slow" query, an environmental optimization of the query may be performed based on the deployment cost estimation function. In selected embodiments, the cost function may be optimized by changing the variable values in the domain space of its variables until finding and outputting a best function output value. In addition, each DBMS server in the system may include a query manager component for optimizing DBMS queries received from a database client device through a collaborative exchange of information between query manager components at interconnected DBMS servers. To this end, each query manager component may be configured to share and/or access query-related data—such as query cost, best query plan, hardware resources, database table cardinalities, database statistics accuracy, database load, and the like—stored at other DBMS servers. In addition, each DBMS server in the system may include a query plan map component that is configured to build a query plan map containing the original query text, rewritten text, the reason to rewrite, and the best and current query plan. Leveraging these components, the DBMS server system has the capability to collaboratively solve performance issues for a query by using solutions and/or query plans from similar DBMS servers to suggest parameter changes, replace the original query text with the rewritten, or otherwise improve the performance of the original query. For example, a received query can be improved by creating new indexes or even dynamically rewritten on a DBMS system based on data from solutions and/or local query plans coming from similar DBMS servers.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
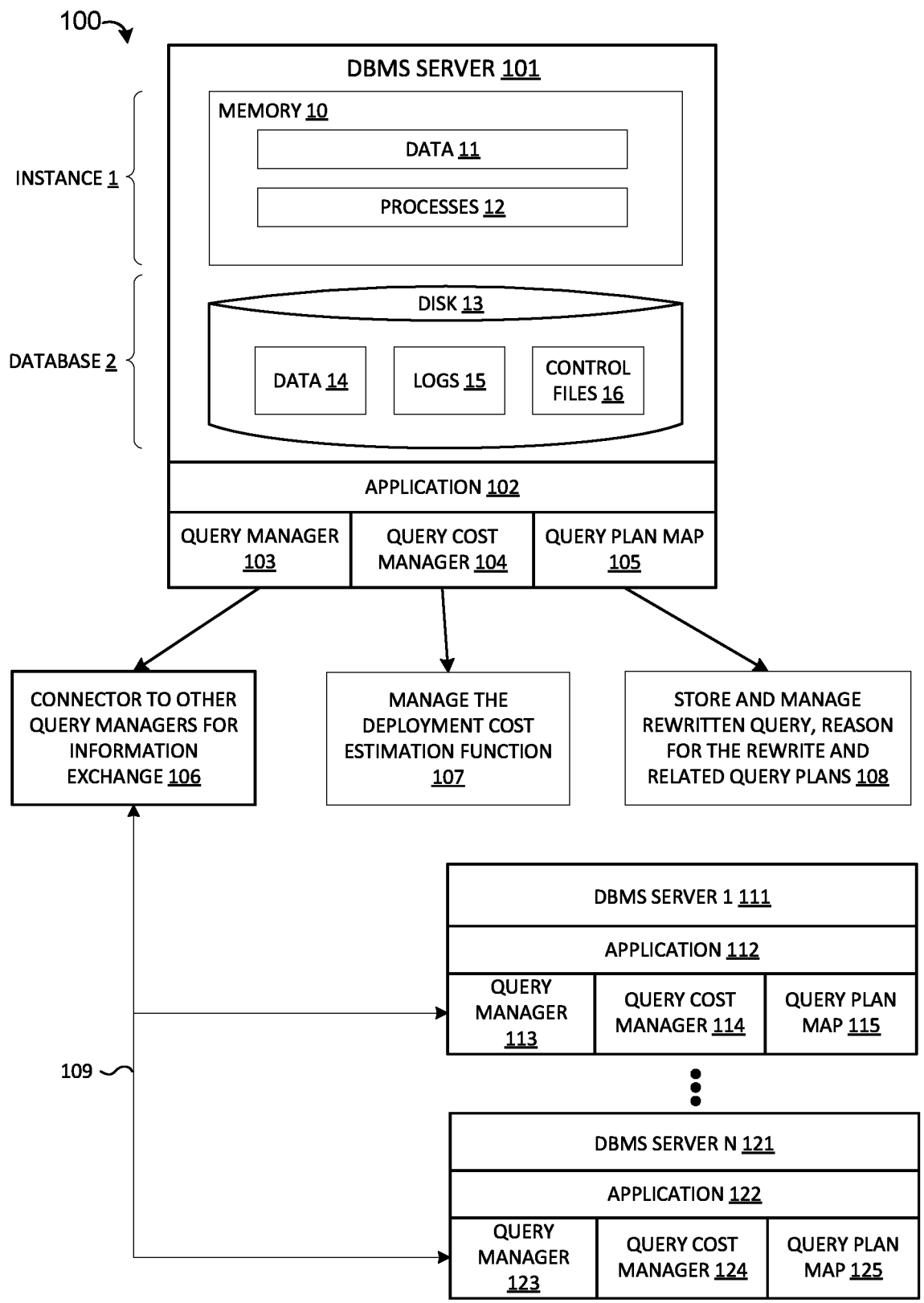
FIG. 1 depicts a DBMS server system for providing collaborative and dynamic query optimization in accordance selected embodiments of the present disclosure.

A method, system, apparatus, computer program product, and apparatus are provided for optimizing database query operations by collaboratively monitoring query executions on different DBMS server machines where a software product is deployed and exchanging information between DBMS server machines to optimize a query on one of them according to the performance and metrics retrieved on the others. As disclosed, a first database management system is operable to receive a database query from a database client device and to determine a query plan for carrying out the database query. In the process of performing the query according to the query plan, the first database management system uses a query manager to determine at least one metric related to the query and the respective query plan. In selected embodiments, the metric may be computed as a cost function based on one or more variables relating to hardware resource consumption, table cardinality of a database table involved in the query, statistics accuracy, and/or a load value of the database management system. By exchanging the metric with one or more query managers at other database management systems, the query manager at the first database management system may be configured to decide, based on the at least one metric, whether or not to replace the query plan with another query plan retrieved from another database management system. In selected embodiments, the query manager at the first database management system may be configured to build a query plan map which includes an original query text, a rewritten query text, and a reason for rewriting the query text. In addition, the query manager at the first database management system may be configured to calculate a modified version of a parameter affecting the execution of the query by the first database management system.

As described herein, embodiments of the present disclosure may be a system, a method, and/or a computer program product. The computer program product may include a non-transitory computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

In an embodiment, an apparatus, system and method for collaboratively optimizing queries in a DBMS network are disclosed. With the apparatus, system and method, each DBMS server builds a global cost estimation function for DBMS queries in a 5-dimension space on the basis of the normalized data gathered at each DBSM server. Using the cost estimate function, low-performing queries may be optimized by changing function variables and/or by collaboratively exchanging of information with query manager components in other DBMS servers to share and/or access query plan map data (e.g., query cost, best query plan, hardware resources, database table cardinalities, database statistics accuracy and database load) for use in building a local query plan map containing the original query text, rewritten text, the reason to rewrite, and the best and current query plan, thereby providing the capability to collaboratively solve performance issues for a query by either suggesting parameter changes or replacing the original query text with a modified, higher performing query text.

To provide a contextual understanding for selected embodiments of the present disclosure, reference is now made to FIG. 1 which shows a diagrammatic depiction of a DBMS system 100 for providing collaborative and dynamic query optimization as between different database management system (DBMS) servers 101, 111, 121. As shown in FIG. 1, each DBMS server may be embodied with any suitable database management server architecture. For example, the first DBMS server 101 may be implemented as a relational DBMS architecture, the general structure of which includes an instance functionality 1 and a database functionality 2 which are operatively connected to function as a relational database. While other database management systems (e.g., object database management systems, XML database management systems, and NoSQL database management systems) may be used, relational DBMSs are a common choice for the storage of information in databases used for financial records, manufacturing and logistical information, personnel data, and other applications due to ease of implementation and administration. Generally speaking, a relational DBMS presents data to the user as relations in tabular form (e.g., as a collection of tables with each table including a set of rows and columns) in which the data may be manipulated by relational operators.

As depicted in the DBSM server 101, the memory 10 may store data 11 and processes 12 for implementing the instance 1 function. For example, the data 11 may include memory model data 11, such as tables (organized in rows and columns), indices, meta code, plan data, SQL statements, and the like. The memory 10 may also include process model data 12, such as reader data, writer data, logging data, checkpoint data, and the like. In addition, the disk 13 may include storage model data for storing the data 14, logs 15, and control files 16 for implementing the database 2 function. At the first DBMS server 101, the application 102 running on top of the depicted database scheme 10-16 includes a query manager component 103, a query cost manager component 104, and a query plan map component 105, as described more fully hereinbelow. In similar fashion, the other DBMS servers 111, 121 in the DBMS server system 100 may run the same DBMS architecture with the same application running (e.g., 102) on top of the same database schema. With each DBMS server 101, 111, 121 having comparable hardware resources and a comparable system load in terms of database statistics, I/O, and CPU, the commonly installed application (e.g., 102) is able to collaborate to identify and solve performance issues on a system, allowing for a dynamic query optimization, such as by improving a query by creating new indexes or even dynamically rewriting the query on a first DBMS server 101 based on data coming from another database management server (e.g., DBMS server 111).

In the depicted DBMS system 100, the DBMS servers 101, 111, 121 are connected to form a server network, wherein each DBMS server (e.g., 101) includes an application (e.g., 102) running on top of the database (e.g., 2) that is the same for all DBMS servers (and so it is the DB schema), and where the DBMS servers 101, 111, 121 each have similar hardware characteristics along with similar database statistics and system load. In this example, each DBMS server (e.g., 101) may include one or more tools which are used to generate a plan for a query and to generate an estimate of the cost of a given step of the query. While any suitable DBMS tools may be used, each DBMS server 101, 111, 121 may include a query plan map tool 105, 115, 125, such as the EXPLAIN tool on IBM's DB2 system, which is configured to generate a plan for a query. In addition, each DBMS server 101, 111, 121 may include a query cost manager tool 104, 114, 124, such as the TIMERON tool on IBM's DB2 system, which is configured to compute the cost of a given step in the query. As will be appreciated, a "timeron" may be computed as an abstract unit of measure that does not directly equate to any actual elapsed time, but gives a rough relative estimate of the resources (cost) required by the database manager to execute a query plan. A timeron's actual duration depends on the underlying hardware (mostly CPU and disk), database statistics and system load. By using timerons as a common way to estimate the query costs that is identical on all computers, a given operation which costs 1 T on a given computer will have the same cost on all other similar computers. With the assumption of similarity between computers in DBMS system 100, there is provided a homogeneous way to estimate the work that is done by the DBMS.

Leveraging this shared ability to compute costs associated with query steps across the depicted DBMS system 100, each DBMS server 101, 111, 121 also includes a query manager tool 103, 113, 123 which is configured to locally monitor the cost estimation for the lowest performing set of queries and its changes along with the database statistics accuracy and system load. In addition, the query manager tool 103, 113, 123 may be configured to compare cost estimations of a given query among DBMS servers 101, 111, 121 that are similar in terms of some parameters (e.g., statistics accuracy and system load), but differ in others (e.g., hardware resources). In selected embodiments, each query manager tool 103, 113, 123 may monitor and manage each query for optimization with a two-step process in which the first environmental optimization step optimizes the environment by generating suggestions for changes to query-external parameters, and where the second query modification step modifies the query, such as by re-writing the query or running one or more additional sql statements which leads to the overwrite of the original behavior dynamically reacting to performance issues.

To assist with the multi-step process, each of the query manager tools 103, 113, 123 in the different DBMS servers 101, 111, 121 communicate with one another to provide an information exchange function between the connected query managers 106. For example, one or more wired or wireless connectors 109 connect the query manager tool (e.g., 103) in a first DBMS server 101 to monitor the execution of a subset of critical queries on different DBMS servers (e.g., 111, 121) in terms of predetermined metrics like query cost, hardware resources, statistics accuracy and system load, and the like. Using the collected metrics, each query cost manager tool 104, 114, 124 in the different DBMS servers 101, 111, 121 manages the deployment cost estimation function 107. For example, the query cost manager tool (e.g., 104) in a first DBMS server 101 may use the predetermined metrics collected from the other DBMS servers (e.g., 111, 121) to build a global cost estimation function. Finally, the query plan map tool 105, 115, 125 provides a query plan storage function 108 whereby any rewritten query is managed and stored, along with identifying reasons for the rewrite and any related query plan(s). In particular, each query plan map tool (e.g., 105) stores the best query plan once the query is executed during normal product operation or in response to an operator's manual query optimization. In addition, the query plan map tool (e.g., 105) analyzes the differences between the current and best query plan to (optionally) rewrite the query based on such differences and share the new query and reason for the rewrite. In this way, each of the DBMS servers 101, 111, 121 which matches the same differences can apply the same rewritten query.

Referring back to the environmental optimization step of the query optimization process, each query manager tool 103, 113, 123 may suggest or enforce query optimization changes to query-external parameters, including but not limited to adjusting the query invocation frequency and/or the buffer pool configuration, running the command to update statistics, expanding the availability of CPU/disk resources, lowering a table cardinality value by deleting old rows, and the like. To support the environmental optimization step, each DBMS server 101, 111, 121 may include a query manager component 103, 113, 123 and a query cost manager component 104, 114, 124. Each query manager component 103, 113, 123 may be configured and connected to contact one another and to synchronize an information exchange using a peer-to-peer approach. In addition, each query cost manager component 104, 114, 124 may be configured to build and use any suitable deployment cost estimation function. In selected example embodiments, the deployment cost estimation function may defined as the cost function C(HR, SA, TC, L), where C=Cost estimation function, HR=Hardware Resources, TC=Table Cardinality, SA=Statistics Accuracy, and L=Load. In this example, the cost function C is constructed with data collected on each deployed DBMS server 101, 111, 121 and shared between the query manager tools 103, 113, 123. In addition, a configurable monitoring interval may be defined to periodically calculate the cost function C for each of the queries in the low performing set, together with the value of the parameters (HR, SA, TC and L) so that a point is selected in the 5-dimensional space for the C curve.

To provide an illustrative example, a first query Q1 may be monitored at time t1 to collect following data for recording and normalization. A first data point, C, is the calculated cost function of 235 timerons. In addition, a second data point, HR, is computed as HR=R*(available RAM in GB)+ P(available CPU in number of cores*core speed), where R and P are constants derived from the tuning phase. In addition, a third data point, TC, is computed as the sum of the number of rows of the tables involved in the query. In addition, a fourth data point, SA is computed as SA=Π (1−elapsed time from last statistics update/deployment lifetime)*(TC weight) for each table involved in the query, where TC weight is the percentage of the table rows respects to the total number of rows. Finally, a fifth data point, L, is computed as 1/(buffer pool hit ratio) for the query. As will be appreciated, a high value of the fifth data point, L, means that data for the query are usually not found in memory, in which case additional I/O is needed.

As depicted, each query cost manager component 104, 114, 124 in the different DBMS servers 101, 111, 121 uses the set of the 5-dimensional points recorded over the monitoring time to build the deployment cost estimation function at the DBMS servers 101, 111, 121. However, it will be appreciated in other embodiments that a centralized query cost manager functionality may be located at a single query optimization server (e.g., 101) which is able to receive data from all the query manager components 103, 113, 123 to centrally manage the deployment cost estimation function.

While the deployment cost estimation function dynamically changes over time, it will reach a reasonably stable formula after a first consolidation phase. When this phase ends, the minimum value for C (Cmin) is calculated for each query being monitored, corresponding to the optimal conditions for the query performance. Whenever the deployment cost function C for a query exceeds a configured threshold starting from that optimal value (e.g., C>Cmin), the query cost manager 104 will activate the first environmental optimization phase, based on the look up in the deployment cost estimation function and comparison of the parameters to find possible parameters that can be changed to lower the deployment cost function C. In selected embodiments, the parameters that exceed the configured threshold Cmin are ranked according to the divergence percentage, and the most divergent parameters are addressed first.

If the environmental optimization phase is not able to solve the issue by reducing the deployment cost function C through changes to query-external parameters, then the second query modification step is run to reduce the cost function by modifying the query. For this second query modification step, each DBMS server 101, 111, 121 may include a query plan map component 105, 115, 125 that works with the query manager component 103, 113, 123 and query cost manager component 104, 114, 124. In selected embodiments, each query plan map component 105, 115, 125 may be embodied as a data structure that links the originally written query text to a corresponding rewritten text along with the reason to rewrite and the best and current query plan. For example, each time the query is monitored, the query plan map component 105, 115, 125 builds a query plan, such as by leveraging the EXPLAIN tool from IBM's DB2 system, and the result is then saved as the current query plan. And if the deployment cost function C for the new query plan is the minimum cost evaluated in the local DBMS server, it is also saved as best query plan for that server.

As disclosed herein, the second query modification step performs a deeper and collaborative analysis on the query plan by comparing a "not performing" query plan with a "performing" best query plan on the same DBMS server (e.g., 101) and also with the best query plans on other DBMS servers (e.g., 111, 121) in the deployed DBMS system 100. By performing a comparative analysis of the query plans in their XML form, it is possible to leverage the XML parsing and search utilities to look for the specific fields, including operators (e.g., SORT, SPLIT, RID LOOKUP, CLUSTERED INDEX SCAN, and so on), operands (the object used by the operator), the cost for each operator, the estimated cardinality for each operator, and the I/O cost for each operator.

In operation, the differences between the query plans are analyzed and the "not performing" operators are identified, such as by selecting the ones exceeding a configured cost threshold compared to the best case. Then, depending on the operator and the comparison of cardinality and I/O cost, an action may be proposed which leverages a knowledge base that is first built with the most common optimization cases already documented, and then dynamically updated by the system. With reference to an example involving the deployment cost estimation function, the comparison is performed by analyzing each of the parameters for an operator and identifying the ones exceeding the configured threshold. In this example, the query plan map component 105 uses the "operator plus exceeding parameters" as the "reason to rewrite." If an action is accepted and implemented—preferably after an administrator approval—the local query plan map component 105 is updated accordingly, and the new query and plan will be used in the future and shared with the peers.

With the query manager components 103, 113, 123 being connected to communicate with one another, each DBMS server can ask for rewritten queries for any locally identified "not performing" queries. In addition, each DBMS server can also acquire rewritten queries from the peer DBMS servers, just by matching the reason to rewrite in a "not performing" entry of the local query plan map component 105. Once a "not performing" query is executed application side, the query manager components 103, 113, 123 are responsible for replacing it with the new rewritten one so that the performance will be automatically improved. For example, if the operator to filter on TABLE1.FIELD1 and TABLE1.FIELD2 is low performing (e.g., has an operator cost which exceeds for example 30% of the same operator in the best case), the system is able to get the estimated cardinality and I/O cost for the operator and its counterpart in the best case, to compare them to check if the differences exceed the threshold, and to match the operator and the exceeding costs in the knowledge base and propose, for example, to create a new index on TABLE1 including FIELD1 and FIELD2.

Another example related to the same issue can arise when the system discovers, through operator comparisons between different plans, that the same filter is performing well if obtained through an already-existing index (e.g., the query manager 103 identifies that a different operand is used for the same operator). In this case, for the DBMSs that allow this, the query is rewritten by adding the WITH (INDEX_NAME) clause. This action will then be added to the knowledge base for future use, and a peer in the network will be able to benefit from this optimization.

In this way, an initial list of general query plan issues and possible corrective actions can be derived from a knowledge base built by a subject matter expert (SME) in the field. Subsequently, the solution can apply it on batches, single queries and single query plan operators and extend it basing on the query plan comparison. This list is the same domain that is used for the "reason to rewrite" field of the query plan map components 105, 115, 125. This field, either for the prefilled entries or for the new dynamically updated ones, is composed by the operator id plus the list of ids corresponding to the query plan fields that exceeds or differs from the best case.

As will be appreciated, each component of the DBMS system 100 may be implemented on a special purpose hardware-based system, for example the DBMS server 101, which performs specified functions or acts or carries out combinations of special purpose hardware and computer instructions to improve the computer functionality in terms of providing a more efficient, fast, and low cost DBSM query plans.

Figure 2:
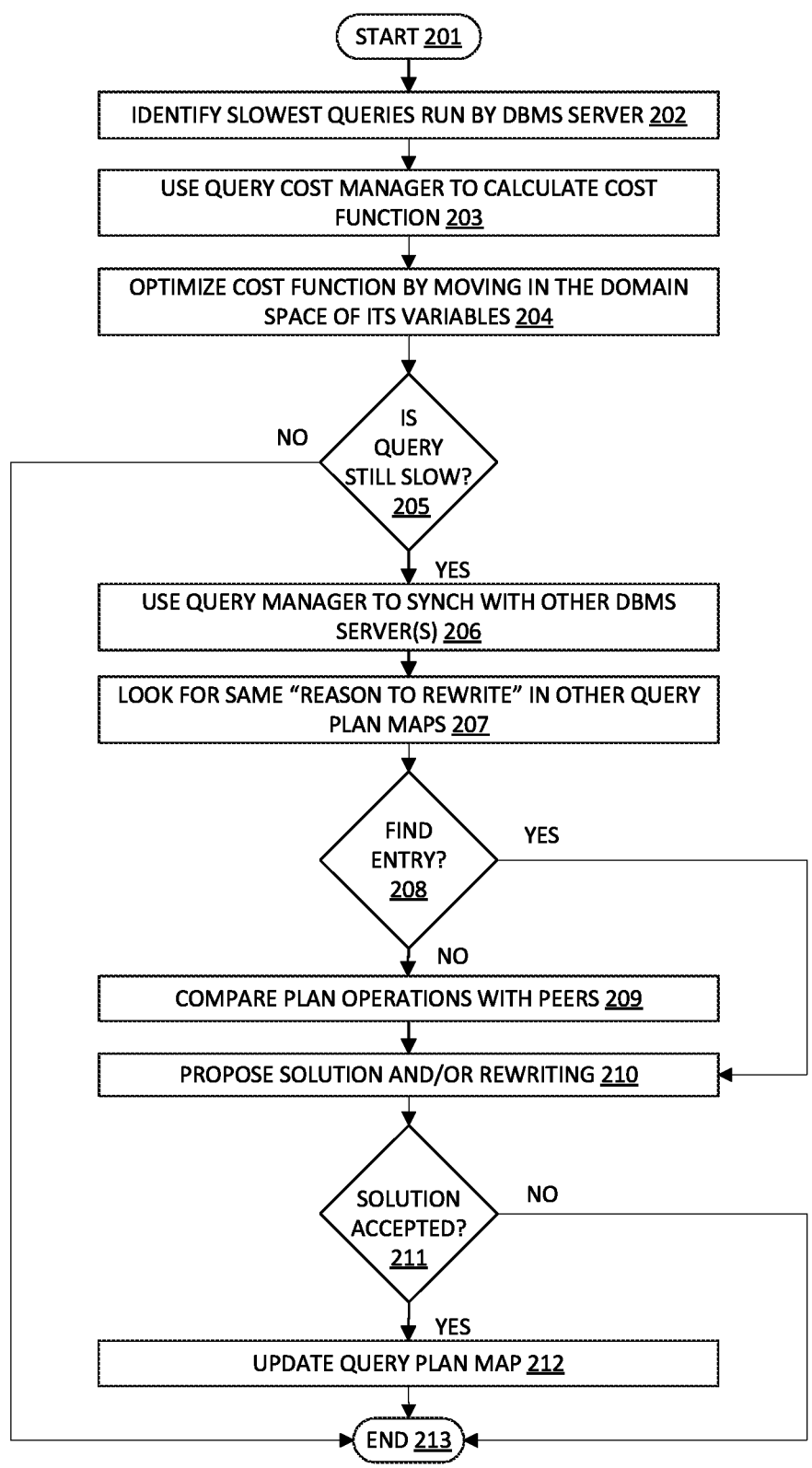
FIG. 2 depicts a simplified flow chart showing the logic for providing collaborative and dynamic query optimization in accordance selected embodiments of the present disclosure.

Referring now to FIG. 2, there is depicted an example flow diagram 200 of the logic for providing collaborative and dynamic query optimization during query processing in accordance with selected embodiments of the present disclosure. In the flow diagram 200, the method steps may be performed by a natural language processing (NLP) or other suitable processing software, hardware and/or firmware at each DMBS server which execute a query plan map application component (which generates a plan for a query and that may give an estimate of the cost of a given step of the query), a query manager application component (which communicates with other DBMS servers to synchronize the exchange of information), and a query cost manager application component (which uses a deployment cost estimation function to evaluate and optimize low-performing DMBS queries with environmental and/or rewrite optimizations).

As a preliminary step, the query optimization process commences at step 201 whereupon the following steps are performed:

Step 202: The query cost manager identifies one or more slow or "low performing" queries. In selected embodiments, the query cost manager identifies the longest running queries running against the DBMS server by ordering the last executed queries by execution time.

Step 203: The query cost manager calculates the cost function for a "low performing" query. In selected embodiments, the query cost manager component manages a deployment cost estimation function by calculating the cost function for the slowest DBMS query in a 5-dimension space on the basis of data collected on the DBMS server at configurable monitoring intervals as the value of C together with the value of the parameters (HR, SA, TC and L) so that a point is selected in the 5-dimensional space for the C curve.

Step 204: Optimize the cost function by moving in the domain space of its variables. In selected embodiments, the query cost manager component optimizes the query's cost function (and therefore the query) by changing the query variable values until finding the best value as the function output. For example, upon determining that the cost function C for a query exceeds a configured threshold starting from that optimal value, the query cost manager component may be configured to activate a first optimization phase based on the look up in the deployment cost estimation function and comparison of the parameters to find possible parameters change to lower C. In selected embodiments, the query cost manager component may be configured to rank the parameters that exceed the same configured threshold according to the divergence percentage, and then to adjust the most divergent (ranked) parameters first.

Step 205: Determine if the query is still slow. At this point, the query cost manager may determine that the query run time has been fixed. If the query is not too slow (negative outcome to detection step 205), then the query has been optimized, and the process may proceed to update the query map in the local knowledge database with the adjusted query plan before ending (step 213). However, if the query run time is still too slow (affirmative outcome to detection step 205), then the next step in the query optimization process is taken.

Step 206: User query manager component to synchronize with one or more additional DMBS servers. To facilitate collaboration between DBMS servers, a query manager component in each DBMS server may be configured to search for query solutions on the other DBMS server(s). Installed on each DBMS server, the query manager component is connected and configured to contact other query manager components and to synchronize the exchange of information in a Peer to Peer (P2P) network wherein peer computer systems are connected to each other via the Internet to access query plan maps on each DBMS server.

Step 207: Look for same "reason to rewrite" in query plan maps of other DBMS server(s). In selected embodiments, the query manager component on a first DBMS server searches for query plan maps on the other DBMS servers to find solutions that could be used for the first DBMS server. On approach for finding solutions is to search the query plan maps for the same "reason to rewrite" entry.

Step 208: Determine if a matching entry is found. At this point, the query manager component may determine if one of the other DBMS servers has a query plan map solution to fix the query runtime speed, such as by looking for a matching "reason to rewrite" entry found on one of the accessed query plan maps. If a matching query plan map entry is found (affirmative outcome to detection step 208), then the process proceeds to Step 210 (described below). However, if there is no matching query plan map entry (negative outcome to detection step 205), then the next step in the query optimization process is taken.

Step 209: Compare plan operations with peers. When no matching query plan map entry is found, the query manager component may then be configured to compare the query plan operations between peer DBMS servers. In selected embodiments, the query manager component compares a low-performing query plan with a "performing" best query plan at the first DBMS server, and then with the best query plan on other DBMS servers in the deployment. To this end, each query manager component is connected to other DBMS query manager components to ask for rewritten queries for identified low-performing queries as the first DBMS server, and/or to acquire rewritten queries from the peer DBMS servers that have matching "reason to rewrite" entries in their local query plan maps.

Step 210: Based on the comparison results from steps 208-209, a query optimization is proposed, either by proposing a solution from another query plan or by rewriting parameters of the local query plan. Depending on the operator and the comparison of cardinality and I/O cost, the query manager component may be configured to propose an optimization by leveraging a knowledge base that is at first built with the most common optimization cases already documented, and then dynamically updated by the system. In selected embodiments, the comparison may be performed by analyzing each of the parameters for an operator and identifying the ones exceeding the configured threshold that are to be rewritten.

Step 211: Determine if a solution is accepted. At this point, it is determined, preferably after an administrator approval, if a proposed solution is accepted to fix the query runtime speed problem at the first DBMS server. If a solution is found (affirmative outcome to detection step 211), then the query manager component is responsible for updating the local query plan map (step 212) by replacing it with the new rewritten one so that the performance will be automatically improved with the new query plan for use in the future and sharing with the peers. However, if there is no solution accepted (negative outcome to detection step 211), then there is no query optimization available, and the process ends (step 213).

As disclosed herein, the collaborative and dynamic query optimization system, method, and/or a computer program product may be implemented with an information handling system which may take the form of an entirely hardware embodiment, an entirely software embodiment (including firmware, resident software, micro-code, etc.) or an embodiment combining software and/or hardware aspects that may all generally be referred to herein as a "circuit," "module," "component" or "system." Furthermore, selected embodiments may take the form of computer program product embodied in a computer readable storage medium (or media) having computer readable program instructions thereon for causing a processor to carry out aspects of the present invention. Thus embodied, the disclosed system, a method, and/or a computer program product is operative to improve the functionality and operation of a computer system by collaboratively working with multiple DBMS servers to identify solutions and/or local query plans which solve query performance problems where queries consume excess system resources or otherwise run too long.

Selected embodiments of the present disclosure are described with reference to dynamically optimizing query plans for a DBMS query by locally monitoring the cost estimation function for the lowest performing set of queries and its changes along with the database statistics accuracy and system load to make environmental optimizations, and by comparing the cost estimation functions of a given query among other DBMS systems that are similar in terms of some parameters (like for example statistics accuracy and system load), but differ in others (for example hardware resources) to rewrite or run of additional sql statements, which leads to the overwrite of the original behavior dynamically reacting to performance issues. However, it will be appreciated that the present disclosure may be also be applied to a variety of DBMS systems parameters to identify optimize the query plans among a deployed network of DBMS servers. In such embodiments, the cost estimate functions (e.g., the 5-dimensional points) may be recorded over the monitoring time to build in every DBMS server in the deployment the deployment cost estimation function, but other embodiments, a query cost manager component may be centralized in a single query optimization server which is able to receive data from all the DBMS servers and centrally manage the deployment cost estimation function.

Figure 3:
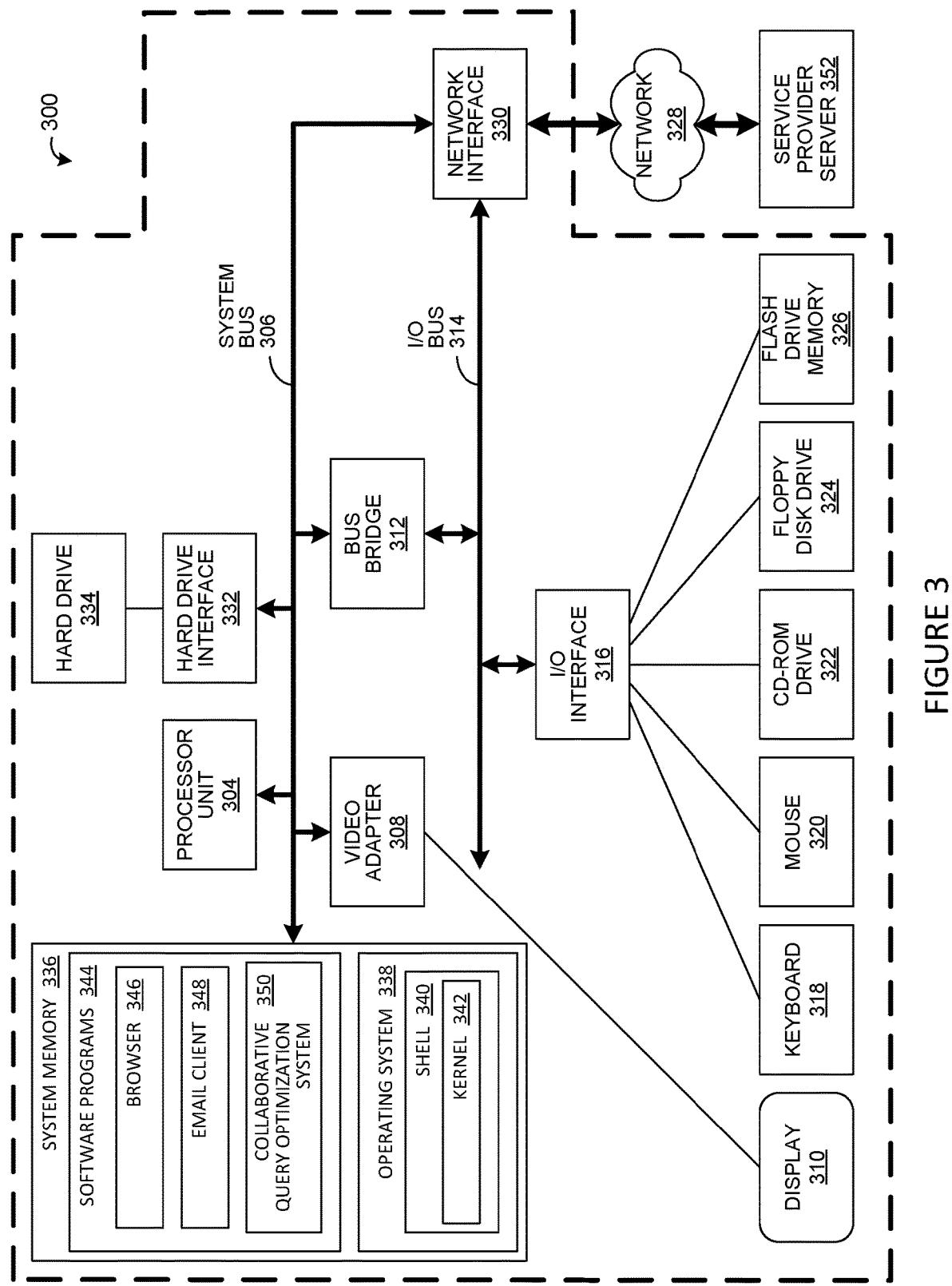
FIG. 3 is a block diagram of a processor and components of an information handling system in accordance selected embodiments of the present disclosure.

Referring now to FIG. 3, there is depicted is a block diagram of a processor and components of a computer 300, such as an information handling system, in accordance selected embodiments of the present disclosure exemplary computer. Computer 300 includes one or more processor units 304 that are coupled to a system bus 306. A video adapter 308, which controls a display 310, is also coupled to system bus 306. System bus 306 is coupled via a bus bridge 312 to an Input/Output (I/O) bus 314. An I/O interface 316 is coupled to I/O bus 314. The I/O interface 316 affords communication with various I/O devices, including a keyboard 318, a mouse 320, a Compact Disk-Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Computer 300 is able to communicate with a service provider server 352 via a network 328 using a network interface 330, which is coupled to system bus 306. Network 328 may be an external network such as the Internet, or an internal network such as an Ethernet Network or a Virtual Private Network (VPN). Using network 328, computer 300 is able to use the present invention to access service provider server 352.

A hard drive interface 332 is also coupled to system bus 306. Hard drive interface 332 interfaces with a hard drive 334. In selected embodiments, hard drive 334 populates a system memory 336, which is also coupled to system bus 306. Data that populates system memory 336 includes the computer's 300 operating system (OS) 338 and software programs 344.

OS 338 includes a shell 340 for providing transparent user access to resources such as software programs 344. Generally, shell 340 is a program that provides an interpreter and an interface between the user and the operating system. More specifically, shell 340 executes commands that are entered into a command line user interface or from a file. Thus, shell 340 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. While shell 340 generally is a text-based, line-oriented user interface, the present invention can also support other user interface modes, such as graphical, voice, gestural, etc.

As depicted, OS 338 also includes kernel 342, which includes lower levels of functionality for OS 338, including essential services required by other parts of OS 338 and software programs 344, including memory management, process and task management, disk management, and mouse and keyboard management. Software programs 344 may include a browser 346 and email client 348. Browser 346 includes program modules and instructions enabling a World Wide Web (WWW) client (i.e., computer 300) to send and receive network messages to the Internet using HyperText Transfer Protocol (HTTP) messaging, thus enabling communication with service provider server 352. In various embodiments, software programs 344 may also include a collaborative query optimization system 350. In these and other embodiments, the collaborative query optimization system 350 includes code for implementing the processes described hereinbelow. In one embodiment, computer 300 is able to download the collaborative query optimization system 350 from a service provider server 352.

The hardware elements depicted in computer 300 are not intended to be exhaustive, but rather are representative to highlight components used by the present invention. For instance, computer 300 may include alternate memory storage devices such as magnetic cassettes, Digital Versatile Disks (DVDs), Bernoulli cartridges, and the like. These and other variations are intended to be within the spirit, scope and intent of the present invention.

By now, it will be appreciated that there is disclosed herein a method, apparatus, and a computer program product ("system") in which a processor, a data bus coupled to the processor, and a computer-usable medium embodying computer program code are provided with instructions executable by the processor and configured for optimizing database query plans. The disclosed system receives a database query from a database client device and determines a query plan for carrying out the database query. In addition, the system computes, with a query cost manager executed by the processor, a global cost estimation function for one or more steps of the database query performed by the database management system based on a plurality of cost metrics related to the database query selected from a group consisting of query cost, hardware resources, database table cardinalities, database statistics accuracy, and database load. In selected embodiments, the system may compute the global cost estimation function C based on a plurality of cost function variables including at least one of a query cost variable, hardware resource consumption variable, database table cardinality variable, database statistics accuracy variable, and a database load value variable. In other embodiments, the system may be configured to build the global cost estimation function C in a 5-dimension space based on normalized performance cost metric data gathered at the database management system. Using a first query manager executed by the processor, the system also identifies at least a first cost metric from the plurality of cost metrics that is low performing. In addition, the system uses the first query manager executed by the processor to collaboratively optimize the query plan at the database management system by comparing differences between the first cost metric and a second cost metric at an additional database management system, thereby generating an optimized query plan for the database management system. In selected embodiments, the system may be configured to exchange, between the first query manager and a second query manager at the additional database management system, the first cost metric for collaboratively optimizing the query plan at the database management system. In other embodiments, the system may be configured to retrieve a second query plan from the additional database management system using the first query manager to communicate with a second query manager at the additional database management system. Based on at least the first cost metric, the system may use the first query manager for deciding whether or not to replace the query plan with a second query plan retrieved from the additional database management system. In selected embodiments, the system may be configured to collaboratively optimize the query plan by changing one or more function variable values in the query plan to reduce the global cost estimation function for the query plan. For example, the first query manager is operable for calculating a modified version of a parameter affecting execution of the database query by the database management system. In addition or in the alternative, the system may be configured to collaboratively optimize the query plan by rewriting the database query to reduce the global cost estimation function for the query plan. In addition or in the alternative, the database management system may include computer instructions that, when executed by the database management system, causes the system to collaboratively optimize the query plan by suggesting or enforcing query optimization changes to physical parameters, including but not limited to adjusting a query invocation frequency, adjusting a buffer pool configuration, running a command to update statistics, expanding an availability of CPU or disk resources, and/or lowering a table cardinality value by deleting old rows. The optimized query plan is then stored at the database management system along with corresponding information identifying a reason for rewriting the optimized query plan. In selected embodiments, the optimized query plan is stored as a query plan map which includes text for database query, rewritten text for database query, a reason to rewrite, and the optimized query plan. Once stored, the optimized query plan may be shared with the additional database management system. In addition, the database query may be executed using the optimized query plan to improve execution of database queries.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A database management system comprising a processor, a data bus coupled to the processor, and a non-transitory computer-usable medium embodying computer program code, the non-transitory computer-usable medium being coupled to the data bus, the computer program code comprising instructions executable by the processor for optimizing database query plans by:

receiving, by the processor, a database query from a database client device;

determining, by the processor, a query plan for carrying out the database query;

computing, with a query cost manager executed by the processor, a global cost estimation function in a 5-dimension space based on normalized performance cost metric data gathered at the database management system for one or more steps of the database query performed by the database management system based on a plurality of cost metrics related to the database query selected from a group consisting of query cost, hardware resources, database table cardinalities, database statistics accuracy, and database load;

identifying, using a first query manager executed by the processor, at least a first cost metric from the plurality of cost metrics that is low performing;

retrieving a second query plan from an additional database management system using the first query manager to communicate with a second query manager at the additional database management system;

collaboratively optimizing, by the first query manager executed by the processor, the query plan at the database management system by communicating with the second query manager at the additional database management system to compare differences between the first cost metric and a second cost metric and then, based on the comparison, changing one or more function variable values in the query plan or rewriting the database query to reduce the global cost estimation function for the query plan, thereby generating an optimized query plan for the database management system; and storing the optimized query plan at the database management system along with corresponding information identifying a reason for rewriting the optimized query plan, where the first query manager is configured and connected to contact the second query manager to synchronize an information exchange in a peer-to-peer network.

2. The database management system of claim 1, where the computer program code further comprises instructions executable by the processor and configured to exchange, between the first query manager and the second query manager at the additional database management system, the first cost metric for collaboratively optimizing the query plan at the database management system.

3. The database management system of claim 1, where the computer program code further comprises instructions executable by the processor and configured to compute the global cost estimation function based on a plurality of cost function variables including at least one of a query cost variable, hardware resource consumption variable, database table cardinality variable, database statistics accuracy variable, and a database load value variable.

4. The database management system of claim 1, where the computer program code further comprises instructions executable by the processor and configured to share the optimized query plan with the additional database management system.

5. The database management system of claim 1, where the computer program code further comprises instructions executable by the processor and configured to store the optimized query plan by storing a query plan map comprising text for database query, rewritten text for database query, a reason to rewrite, and the optimized query plan.

6. The database management system of claim 1, wherein the first query manager is operable for deciding, based on at least the first cost metric, whether or not to replace the query plan with the second query retrieved from the additional database management system.

7. The database management system of claim 1, wherein the first query manager is operable for calculating a modified version of a parameter affecting execution of the database query by the database management system.

8. An information handling system comprising:
one or more processors;
a memory coupled to at least one of the processors;
a set of instructions stored in the memory and executed by at least one of the processors to optimize database query plans, wherein the set of instructions are executable to perform actions of:
receiving, by the system, a database query from a database client device;
determining, by the system, a query plan for carrying out the database query;
computing, with a query cost manager executed by the system, a global cost estimation function in a 5-dimension space for one or more steps of the database query performed by the system based on a plurality of cost metrics related to the database query selected from a group consisting of query cost, hardware resources, database table cardinalities, database statistics accuracy, and database load;
identifying, using a first query manager executed by the system, at least a first cost metric from the plurality of cost metrics that is low performing;
retrieving, by the system, a second query plan from an additional database management system using the first query manager to communicate with a second query manager at the additional database management system;
collaboratively optimizing, by the first query manager executed by the system, the query plan at the system by communicating with the second query manager at the additional database management system to compare differences between the first cost metric and a second cost metric and then, based on the comparison, changing one or more function variable values in the query plan or rewriting the database query to reduce the global cost estimation function for the query plan, thereby generating an optimized query plan for the system; and
storing the optimized query plan at the system along with corresponding information identifying a reason for rewriting the optimized query plan,
where the first query manager is configured and connected to contact the second query manager to synchronize an information exchange in a peer-to-peer network.

9. The information handling system of claim 8, wherein the set of instructions are executable to compute the global cost estimation function in the 5-dimension space based on a plurality of cost function variables including at least one of a query cost variable, hardware resource consumption variable, database table cardinality variable, database statistics accuracy variable, and a database load value variable.

10. The information handling system of claim 8, wherein the set of instructions are executable to build the global cost estimation function in the 5-dimension space based on normalized performance cost metric data gathered at the system.

11. The information handling system of claim 8, wherein the set of instructions are executable to share the optimized query plan with the additional information handling system.

12. The information handling system of claim 8, wherein the set of instructions are executable to store the optimized query plan by storing a query plan map comprising text for database query, rewritten text for database query, a reason to rewrite, and the optimized query plan.

13. A computer program product stored in a non-transitory computer readable storage medium, comprising computer instructions that, when executed by a processor at a database management system, causes the database management system to optimize a database query plan by:
determining, by the database management system, a query plan for carrying out a database query;
computing, with a query cost manager at the database management system, a global cost estimation function in a 5-dimension space for one or more steps of the database query performed by the database management system based on a plurality of cost metrics related to the database query selected from a group consisting of query cost, hardware resources, database table cardinalities, database statistics accuracy, and database load;
identifying, using a first query manager at the database management system, at least a first cost metric from the plurality of cost metrics that is low performing;
retrieving, by the database management system, a second query plan from an additional database management system using the first query manager to communicate with a second query manager at the additional database management system;
collaboratively optimizing, by the first query manager, the query plan at the database management system by communicating with a second query manager at an additional database management system to compare differences between the first cost metric and a second cost metric and then, based on the comparison, changing one or more function variable values in the query plan or rewriting the database query to reduce the global cost estimation function for the query plan, thereby generating an optimized query plan for the database management system;
storing the optimized query plan at the database management system along with corresponding information identifying a reason for rewriting the optimized query plan; and
sharing, by the database management system, the optimized query plan with the additional database management system,
where the first query manager is configured and connected to contact the second query manager to synchronize an information exchange in a peer-to-peer network.

14. The non-transitory computer program product of claim 13, further comprising computer instructions that, when executed by an database management system, causes the system to store the optimized query plan as a query plan map comprising text for database query, rewritten text for database query, a reason to rewrite, and the optimized query plan.

15. The non-transitory computer program product of claim 13, further comprise computer instructions that, when executed by the database management system, causes the system to collaboratively optimize the query plan by suggesting or enforcing query optimization changes to physical parameters, including but not limited to adjusting a query invocation frequency, adjusting a buffer pool configuration, running a command to update statistics, expanding an availability of CPU or disk resources, and/or lowering a table cardinality value by deleting old rows.

* * * * *